(12) United States Patent
Zink et al.

(10) Patent No.: US 11,940,014 B2
(45) Date of Patent: Mar. 26, 2024

(54) DRIVELINE COMPONENT HAVING LIGHTWEIGHT BALL-RAMP MECHANISM

(71) Applicant: American Axle & Manufacturing, Inc., Detroit, MI (US)

(72) Inventors: Frederick E. Zink, Capac, MI (US); Robert S. Kleinhardt, Romeo, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 142 days.

(21) Appl. No.: 17/683,689

(22) Filed: Mar. 1, 2022

(65) Prior Publication Data

US 2022/0178404 A1 Jun. 9, 2022

Related U.S. Application Data

(63) Continuation of application No. PCT/US2020/051772, filed on Sep. 21, 2020.

(60) Provisional application No. 62/912,714, filed on Oct. 9, 2019.

(51) Int. Cl.
| | |
|---|---|
| *F16D 23/12* | (2006.01) |
| *F16D 13/52* | (2006.01) |
| *F16D 28/00* | (2006.01) |
| *F16H 48/22* | (2006.01) |
| *F16H 48/30* | (2012.01) |

(52) U.S. Cl.
CPC ............ *F16D 23/12* (2013.01); *F16D 13/52* (2013.01); *F16D 2023/123* (2013.01); *F16D 28/00* (2013.01); *F16H 48/22* (2013.01); *F16H 48/30* (2013.01)

(58) Field of Classification Search
CPC .... F16D 23/12; F16D 2023/123; F16D 13/52; F16D 28/00; F16D 27/115; F16D 27/14; F16H 48/22; F16H 48/30
See application file for complete search history.

(56) References Cited

U.S. PATENT DOCUMENTS

| | | | |
|---|---|---|---|
| 4,950,214 A | * 8/1990 | Botterill | ................ F16H 48/295 475/231 |
| 6,398,686 B1 | * 6/2002 | Irwin | .................... F16H 48/295 192/93 A |
| 6,561,939 B1 | * 5/2003 | Knapke | ................... F16D 13/52 192/84.6 |
| 7,374,508 B2 | 5/2008 | Ducan | |

(Continued)

FOREIGN PATENT DOCUMENTS

WO WO2018119260 A1 6/2018

OTHER PUBLICATIONS

Written Opinion and International Search Report for International Application PCT/US2020/051772, dated Dec. 30, 2020.

*Primary Examiner* — Timothy Hannon
(74) *Attorney, Agent, or Firm* — Reising Ethington P.C.

(57) ABSTRACT

A vehicle driveline component with a ball-ramp mechanism that includes a first ball-ramp ring, a second ball-ramp ring and a plurality of balls. Each of the first and second ball-ramp rings have a plurality of ball supports that define ball tracks that receive the balls. Each of the ball supports has a first radial width at a first location and a second radial width at a second location. The first and second widths are different to minimize the amount of material that forms the first and second ball-ramp rings.

22 Claims, 14 Drawing Sheets

(56) References Cited

U.S. PATENT DOCUMENTS

| | | | |
|---|---|---|---|
| 7,602,271 B2 | 10/2009 | York et al. | |
| 8,597,150 B1 | 12/2013 | Downs et al. | |
| 8,986,151 B2 | 3/2015 | Valente et al. | |
| 9,302,581 B1 | 4/2016 | Valente | |
| 9,346,354 B2 | 5/2016 | Valente | |
| 10,527,148 B2 | 1/2020 | Valente et al. | |
| 10,732,155 B2 | 8/2020 | Valente et al. | |
| 11,118,664 B2 | 9/2021 | Zink et al. | |
| 2003/0209398 A1* | 11/2003 | Organek | F16D 27/115 |
| | | | 192/84.7 |
| 2005/0167229 A1 | 8/2005 | Tsukada et al. | |
| 2007/0087890 A1* | 4/2007 | Hamrin | F16H 48/30 |
| | | | 475/249 |
| 2007/0095628 A1* | 5/2007 | Niederbacher | F16D 28/00 |
| | | | 192/70.23 |
| 2016/0327092 A1 | 11/2016 | Carr et al. | |
| 2017/0321763 A1 | 11/2017 | Younggren et al. | |
| 2018/0080508 A1 | 3/2018 | Nahrwold et al. | |
| 2018/0172124 A1 | 6/2018 | Valente et al. | |
| 2019/0277346 A1* | 9/2019 | Pritchard | F16D 13/52 |
| 2022/0136567 A1* | 5/2022 | Willsch | F16D 23/12 |
| | | | 192/82 R |

\* cited by examiner

DRIVELINE COMPONENT HAVING LIGHTWEIGHT BALL-RAMP MECHANISM

CROSS-REFERENCE TO RELATED APPLICATIONS

This application is a (bypass) continuation of International Application No. PCT/US2020/051772 filed Sep. 21, 2020, which claims the benefit of U.S. Provisional Application No. 62/912,714, filed on Oct. 9, 2019. Each of the above-referenced application is incorporated by reference as if fully set forth in detail herein.

FIELD

The present disclosure relates to a driveline component having a lightweight ball-ramp mechanism.

BACKGROUND

This section provides background information related to the present disclosure which is not necessarily prior art.

Ball-ramp mechanisms are commonly employed in various driveline components, such as differentials, axle assemblies, power take-off units and transfer cases, to produce thrust in response to relative rotational movement between a pair of ball-ramp rings. The ball-ramp rings of the ball-ramp mechanism are typically disposed about a rotational axis and are sized in diameter in relation to the amount of thrust that is required. Conventional ball-ramp mechanisms do not have ball-ramp rings that are optimized to reduce their mass. This extra mass in the ball-ramp rings of a conventional ball-ramp mechanism are associated with additional cost and weight, which can be significant in situations where the ball-ramp rings are relatively large in diameter so that the ball-ramp mechanism can provide relatively large amounts of thrust.

SUMMARY

This section provides a general summary of the disclosure, and is not a comprehensive disclosure of its full scope or all of its features.

In one form, the present disclosure provides a vehicle driveline component having a ball-ramp mechanism that includes a first ball-ramp ring, a second ball-ramp ring and a plurality of balls. The first and second ball-ramp rings are disposed concentrically about an actuation axis. Each of the first and second ball-ramp rings have a backing structure and a plurality of ball supports that are fixedly coupled to the backing structure. The backing structure defines a rear surface. The ball supports are spaced circumferentially about the actuation axis and extend forwardly of the backing structure. The ball supports cooperate to define a front face. Each of the ball supports define a ball track. Each ball track has a first circumferential end, which is disposed below the front face by a first dimension, and a second circumferential end that is disposed below the front face by a second dimension that is less than the first dimension. Each of the ball tracks has a radial width that tapers between the first circumferential end and the second circumferential end. Each of the balls is received in an associated one of the ball tracks and is movable between the first and second circumferential ends of the associated one of the ball tracks. Each of the ball supports has a first radial width at a first location where the first circumferential end intersects the front face and a second radial width at a second location where the second circumferential end intersects the front face. The first radial width is taken along a first line passing through the actuation axis and a center of an associated one of the balls that is disposed in the first circumferential end. The second width is taken along a second line passing through the actuation axis and the center of the associated one of the balls that is disposed in the second circumferential end.

In another form, the present disclosure provides a vehicle driveline component having a ball-ramp mechanism with a first ball-ramp ring, a second ball-ramp ring and a plurality of balls. The first and second ball-ramp rings are disposed concentrically about an actuation axis. Each of the first and second ball-ramp rings define a plurality of ball tracks. Each of the ball tracks has an intermediate track portion and first and second track portions that are disposed on opposite sides of the intermediate track portion. The first ramp portions are configured with a first ramp rate, while the second ramp portions are configured with a second ramp rate that is different than the first ramp rate. Each of the balls is received into associated ball tracks in the first and second ball-ramp rings. Rotation of the first ball-ramp ring relative to the second ball-ramp ring in a first rotational direction when the balls are disposed in the intermediate track portions drives the balls into the first track portions to drive the first and second ball-ramp rings apart from one another at the first ramp rate. Rotation of the first ball-ramp ring relative to the second ball-ramp ring in a second rotational direction that is opposite the first rotational direction when the balls are disposed in the intermediate portions drives the balls into the second track portions to drive the first and second ball-ramp rings apart from one another at the second ramp rate.

In still another form, the present disclosure provides a vehicle driveline component that includes a ball-ramp mechanism having a first ball-ramp ring, a second ball-ramp ring and a plurality of balls. The first and second ball-ramp rings are disposed about an actuation axis. Each of the first and second ball-ramp rings defines a plurality of ball tracks. Each of the balls is received into an associated set of ball tracks in the first and second ball-ramp rings. Each set of ball tracks is nested with at least one other set of ball tracks such that each set of ball tracks extends circumferentially about the first and second ball-ramp rings over a sector of the first and second ball-ramp rings having a central angle that is greater than or equal to 360 degrees divided by a total quantity of the of the sets of ball tracks.

In yet another form, the present disclosure provides a vehicle driveline component that includes a ball-ramp mechanism having a first ball-ramp ring, a second ball-ramp ring and a plurality of balls. The first and second ball-ramp rings are disposed about an actuation axis. Each of the first and second ball-ramp rings defines a plurality of ball tracks that are disposed eccentrically about the actuation axis. Each of the balls is received into an associated set of ball tracks in the first and second ball-ramp rings.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 18:
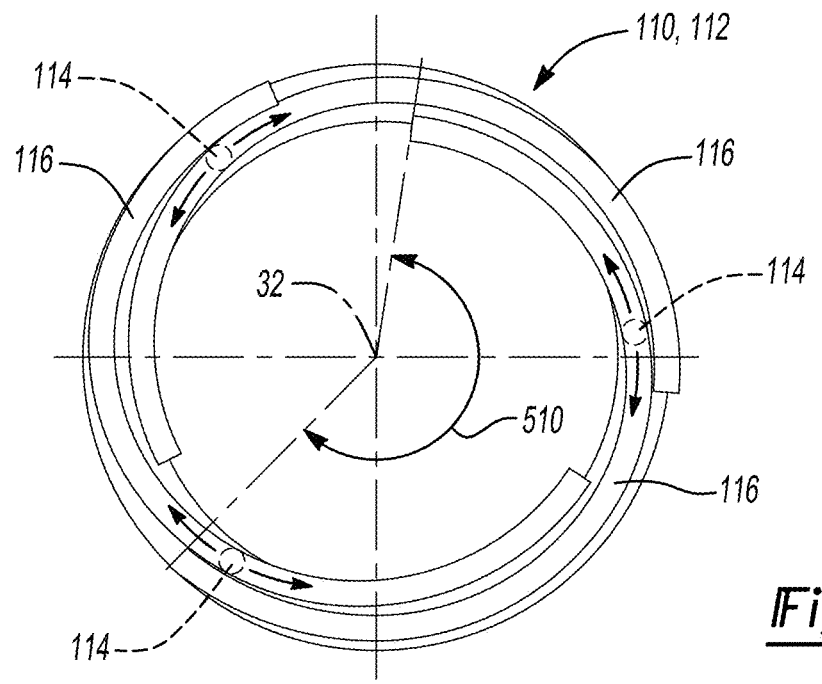
Figure 19:
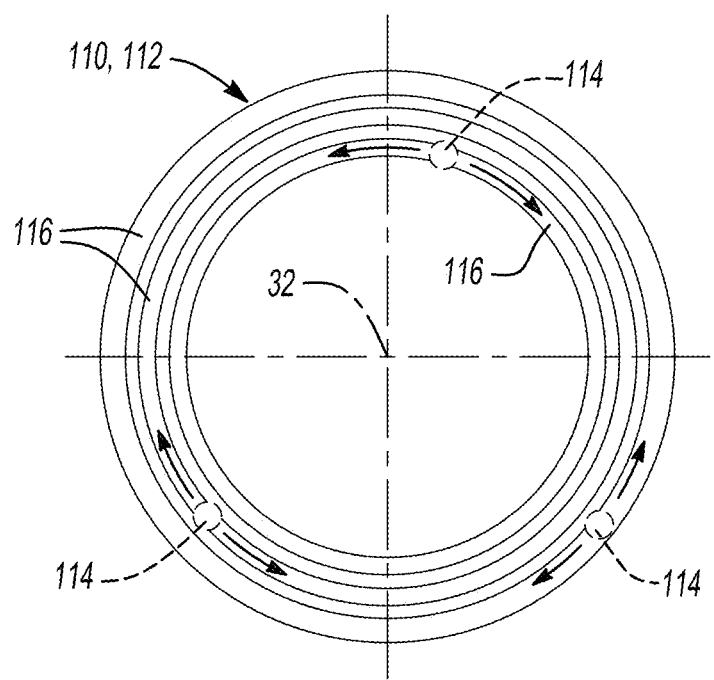
Figure 20:
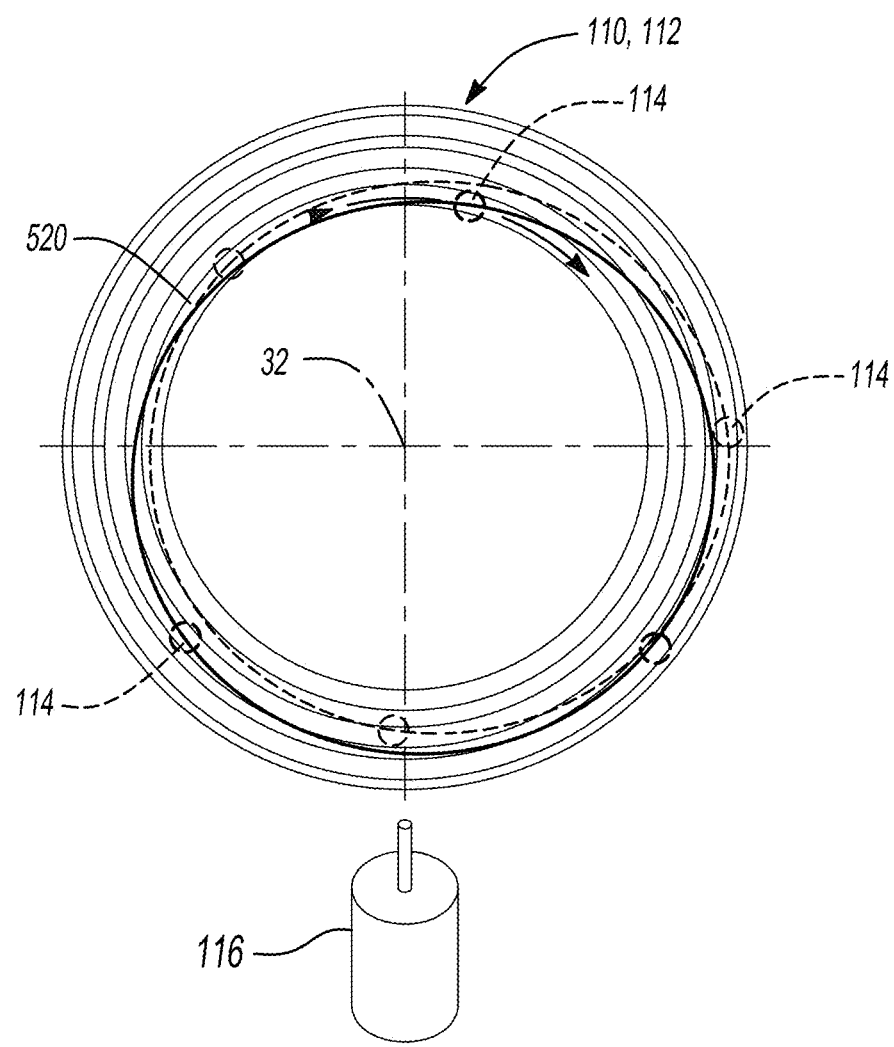

FIGS. 18 and 19 are schematic illustrations of exemplary ball-ramp mechanisms having nested ball tracks that are configured in a nested eccentric manner and in a concentric manner, respectively; and FIG. 20 is a schematic illustration of an exemplary ball-ramp mechanism having eccentric ball tracks that cause at least one of the ball-ramp rings to move in an eccentric manner about an actuation axis.

Corresponding reference numerals indicate corresponding parts throughout the several views of the drawings.

DETAILED DESCRIPTION

Figure 1:
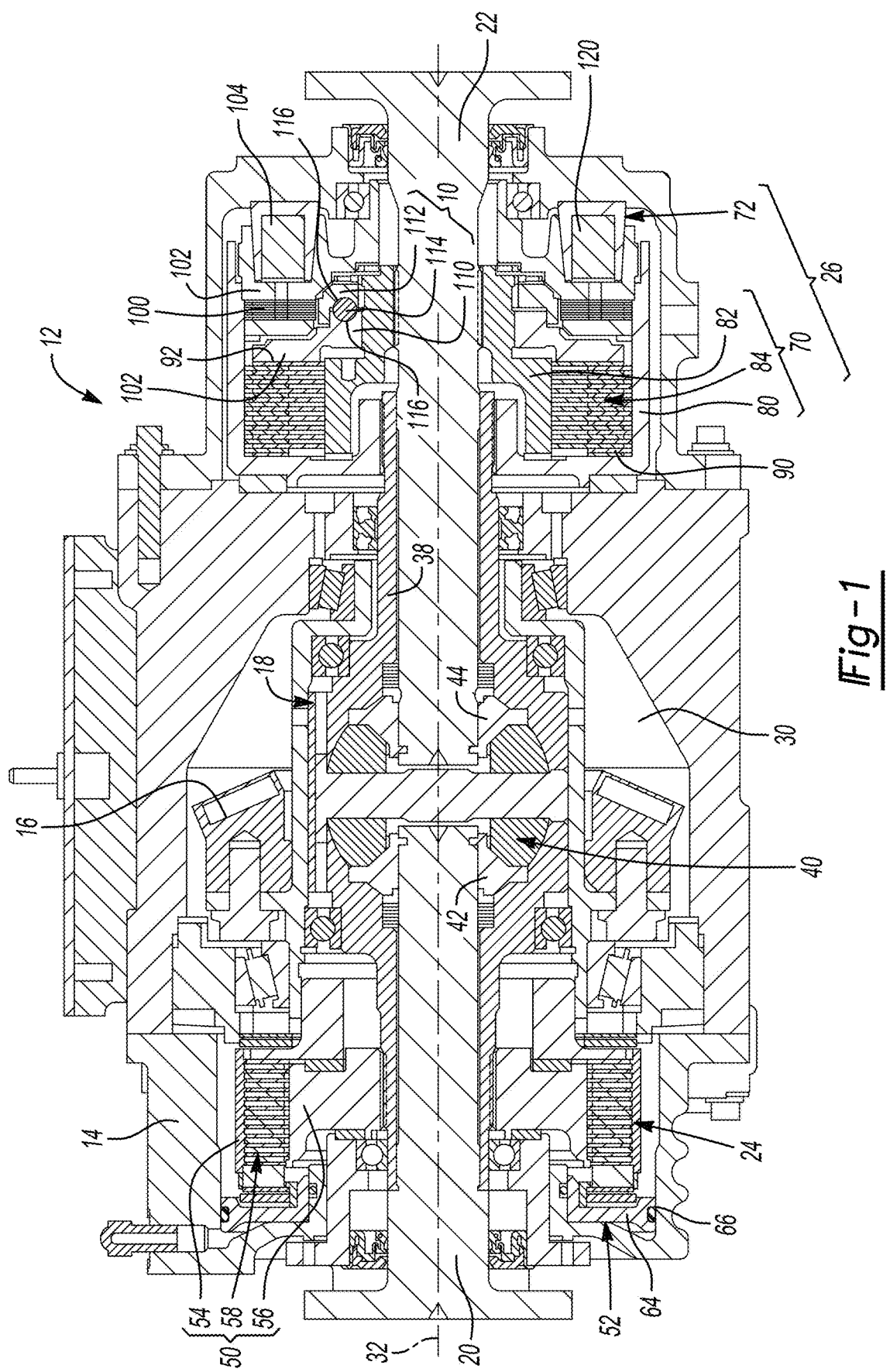
FIG. 1 is a transverse section view of a first vehicle driveline component having a ball-ramp mechanism constructed in accordance with the teachings of the present disclosure.

With reference to FIG. 1, an exemplary ball-ramp mechanism constructed in accordance with the teachings of the present disclosure is generally indicated by reference numeral 10. The ball-ramp mechanism 10 is shown in an exemplary vehicle driveline component that is illustrated to be a rear axle assembly 12 having a housing 14, a ring gear 16, a differential assembly 18, first and second output shafts 20 and 22, a first clutch assembly 24 and a second clutch assembly 26. The housing 14 conventionally defines a cavity 30 and a differential axis 32. The ring gear 16 is received in the cavity 30 and is supported by the housing 14 for rotation about the differential axis 32. The ring gear 16 is meshingly engaged with an input pinion (not shown) that is received in the cavity 30 and supported by the housing 14 for rotation about a pinion axis (not shown) that is transverse to the differential axis 32.

The differential assembly 18 is disposed in the cavity 30 and includes a differential input 38 and a differential gearset 40. The differential input 38 is rotatable relative to the ring gear 16 about the differential axis 32 and provides rotary power to the differential gearset 40. The differential gearset 40 includes a pair of side gears 42 and 44 that are rotatable relative to the differential input 38 about the differential axis 32. The side gears 42 and 44 are the outputs of the differential assembly 18. The first output shaft 20 is rotationally coupled to the side gear 42, while the second output shaft 22 is rotationally coupled to the side gear 44. The first clutch assembly 24 is configured to selectively couple the differential input 38 to the ring gear 16 for rotation therewith.

The first clutch assembly 24 is configured to selectively decouple the ring gear 16 from the differential assembly 18. The first clutch assembly 24 can include a first clutch 52 and a first actuator 52. The first clutch 50 can be any type of clutch, such as a friction clutch having an outer clutch basket 54, a clutch hub 56 and a clutch pack 58. In the example provided, the outer clutch basket 54 is a clutch input member and is coupled to the ring gear 16 for rotation therewith about the differential axis 32, the clutch hub 56 is coupled to the differential input 38 for common rotation about the differential axis 32, and the clutch pack 58 has two sets of clutch plates that are each non-rotatably but axially slidably coupled to an associated one of the outer clutch basket 54 and the clutch hub 56. The first actuator 52 can be any mechanism that can be configured to operate the first clutch 50, such as a hydraulic cylinder that includes a piston 64 that is movably mounted in a bore 66 in the housing 14. A pressurized hydraulic fluid can be employed to translate the piston 64 in the bore 66 to compress the clutch pack 58 to drivingly couple the clutch hub 56 to the outer clutch basket 54 to thereby transmit rotary power from the ring gear 16 to the differential input 38.

The second clutch assembly 26 is configured to limit speed differentiation between the first and second output shafts 20 and 22. In the example provided, the second clutch assembly 26 includes a friction clutch 70 and a second actuator 72. The friction clutch 70 includes an outer clutch basket 80, a clutch hub 82 and a clutch pack 84. The outer clutch basket 60 is the input of the friction clutch 70 and is rotationally coupled to the differential input 38, while the clutch hub 82 is the output of the friction clutch 70 and is rotationally coupled to the second output shaft 22. The clutch pack 84 includes a plurality of first clutch plates 90, which are rotationally coupled to the outer clutch basket 80, and a plurality of second clutch plates 92 that are interleaved with the first clutch plates 90 and rotationally coupled to the clutch hub 82.

The second actuator 72 includes the ball-ramp mechanism 10, a secondary clutch pack 100, a pair of apply plates 102 and a secondary actuator 104. The ball-ramp mechanism 10 will be discussed in more detail below, but generally includes a first ball-ramp ring 110, a second ball-ramp ring 112 and a plurality of balls 114 that are disposed between the first and second ball-ramp rings 110 and 112 in ball tracks or grooves 116 formed in each of the first and second ball-ramp rings 110 and 112. The first and second ball-ramp rings 110 and 112 are concentrically disposed about and are rotatable relative to one another about an actuation axis (i.e., the differential axis 32 in the example provided). The first and second ball-ramp rings 110 and 112 can be disposed radially between the outer clutch basket 82 and the clutch hub 84. The first ball-ramp ring 110 can abut one of the second clutch plates 92 and can be rotationally coupled to the clutch hub 84. The secondary clutch pack 100 has a plurality of first friction plates, which are non-rotatably coupled to the outer clutch basket 80, and a plurality of second friction plates that are interleaved with the first friction plates and non-rotatably coupled to the second ball-ramp ring 112. The apply plates 102 can be disposed on the opposite axial ends of the secondary clutch pack 100 and can be coupled to the outer clutch basket 80 for rotation therewith. The secondary actuator 104 can be any type of actuator that cause relative axial movement between the apply plates 102 to selectively compress the secondary clutch pack 100 therebetween. For example, the secondary actuator 104 could be configured as a hydraulic cylinder. In the example provide, however, the secondary actuator comprises an annular electromagnet 120. The electromagnet 120 is fixedly coupled to the housing 14 and is configured to selectively generate a magnetic field that can draw the distal apply plate 102 along the differential axis 32 toward the secondary clutch pack 100 and the other (proximal) apply plate 102. When electric power is applied to the electromagnet 120 to cause the electromagnet 120 to generate the magnetic field, the distal apply plate 102 responsively moves toward the electromagnet 120 and compresses the secondary clutch pack 100 between itself (i.e., the distal apply plate 120) and the proximal apply plate 102, which is fixedly coupled to the outer clutch basket 80, so as to transfer rotary power from the outer clutch basket 80 through the secondary clutch pack 100 to the second ball-ramp ring 112. The magnitude of the torque transmitted through the secondary clutch pack 100 is dependent upon the strength of the magnetic field. Consequently, the amount of relative rotation between the first and second ball-ramp rings 110 and 112, which controls the axial distance by which the ball-ramp mechanism 10 can compress the clutch pack 84 of the friction clutch 70 and therefore the amount of torque that can be passed through the friction clutch 70 between the differential input 38 and the second output shaft 22, can be controlled by varying the strength of the magnetic field that is produced by the electromagnet 120.

While the ball-ramp mechanism 10 has been illustrated and described in conjunction with a rear axle assembly and operated in response to the application of a magnetic field, it will be appreciated that a ball-ramp mechanism constructed in accordance with the teachings of the present disclosure can be incorporated into various other types of vehicle driveline components, such as transfer cases, transmissions, transaxles and power take-off units (PTU's), and/or that the ball-ramp mechanism could be operated in various other ways, including via a rotary electric motor that drives one of the first and second ball-ramp rings relative to the other one of the first and second ball-ramp rings, either directly or through differential rotary motion that can be imparted through meshing engagement of a gear with one or both of the first and second ball-ramp rings, or through magnetic fields or eddy currents that are applied to one or both of the first and second ball-ramp rings.

Figure 2:
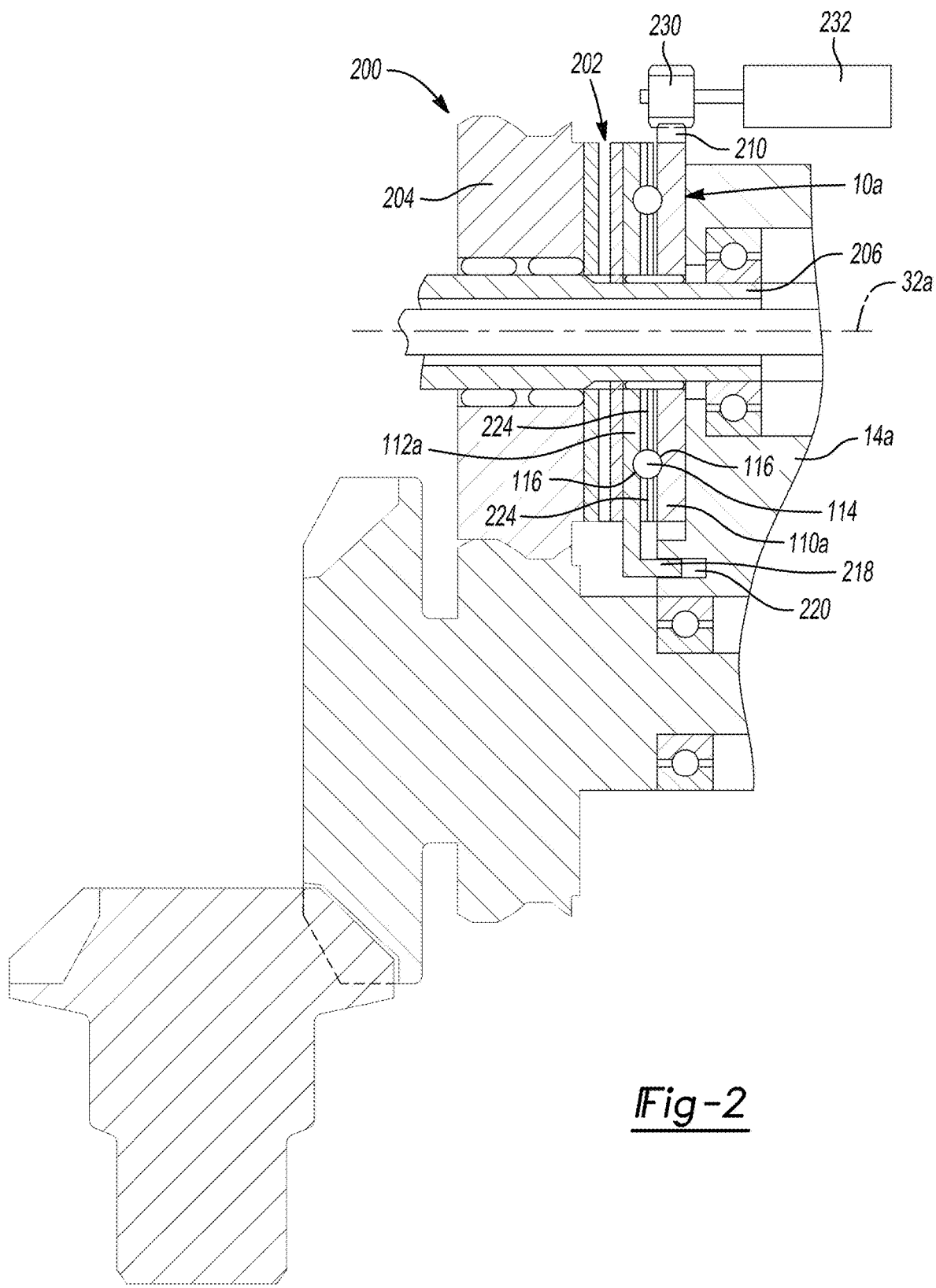
FIG. 2 is a transverse section view of a portion of a second vehicle driveline component having a ball-ramp mechanism constructed in accordance with the teachings of the present disclosure.

In the example of FIG. 2, the ball-ramp mechanism 10a is shown in a PTU 200 and is configured to control engagement of a friction clutch 202 that is disposed between a PTU input member 204 and a differential input member 206 of a front differential (not fully shown). Except as described below, the ball-ramp mechanism 10a can be identical to the ball-ramp mechanism 10 described above.

Figure 3:
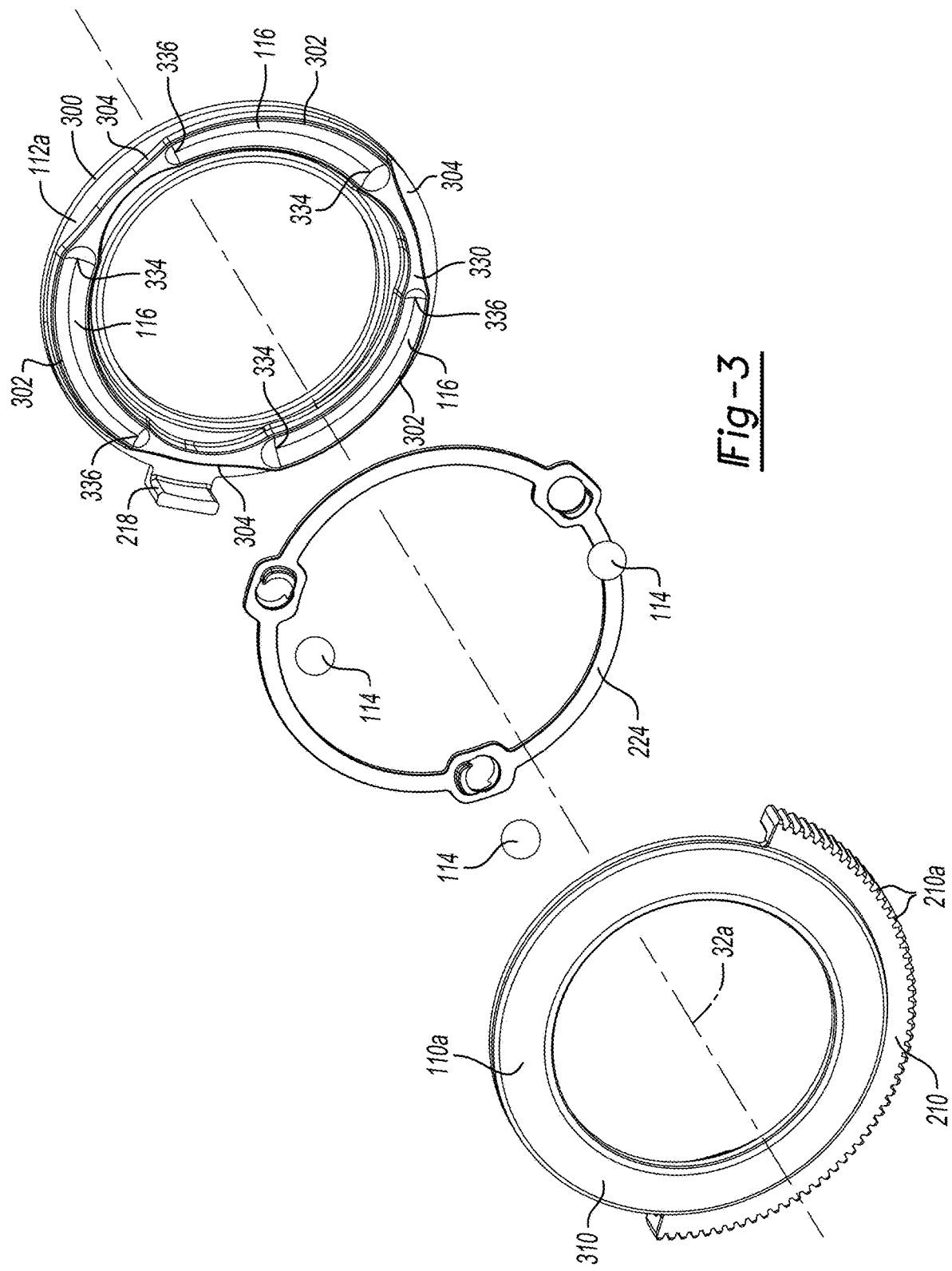
FIG. 3 is an exploded perspective view of a portion of the ball-ramp mechanism of FIG. 2.

With additional reference to FIG. 3, a gear element, such as a sector gear 210, is fixedly coupled to the first ball-ramp ring 110a and includes a plurality of sector gear teeth 210a. In the example provided, the sector gear 210 is unitarily and integrally formed with the first ball-ramp ring 110a, but it will be appreciated that the sector gear 210 could be formed as a discrete component and assembled to the first ball-ramp ring 110a or could be formed onto the first ball-ramp ring 110a (e.g., formed of plastic that is overmolded onto the first ball-ramp ring 110a). The first ball-ramp ring 110a is supported by the housing 14a of the PTU 200 for rotation about an actuation axis, which happens to be a front differential axis 32a in the example provided. The second ball-ramp ring 112a is non-rotatably but axially slidably coupled to the housing 14a for movement along the actuation axis. In the particular example provided, the second ball-ramp ring 112a includes an L-shaped tab 218 that is configured to be received in an axially extending slot 220 formed in the housing 14a. Each of the balls 114 is received into an associated set of the ball tracks 116 in the first and second ball-ramp rings 110a and 112a. If desired, the balls 114 can be received in an annular cage 224 that maintains the circumferential spacing of the balls 114 in a desired manner. The sector gear teeth 210a can be engaged by an input gear 230 that is driven by an electric motor 232. In the example provided, the sector gear 210 is a portion of a spur gear and the input gear 230 is another spur gear that meshingly engages the worm gear. It will be appreciated, however, that the sector gear 210 and the input gear 230 could be configured differently (e.g., as helical gears or as a worm gear and worm, respectively), and that a gear reduction could be employed between the electric motor 232 and the input gear 230.

Figure 5:
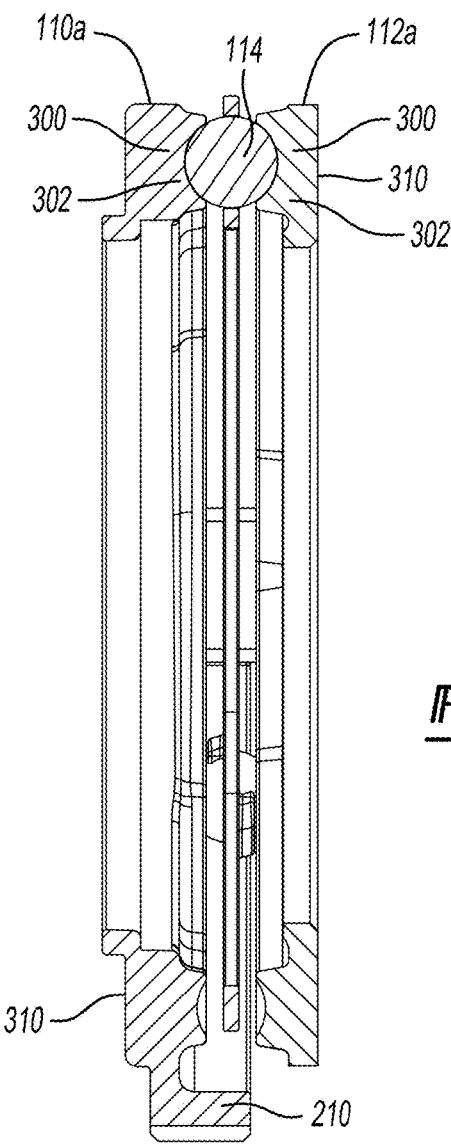
FIG. 5 is a section view taken along the line 5-5 of FIG. 4.
Figure 7:
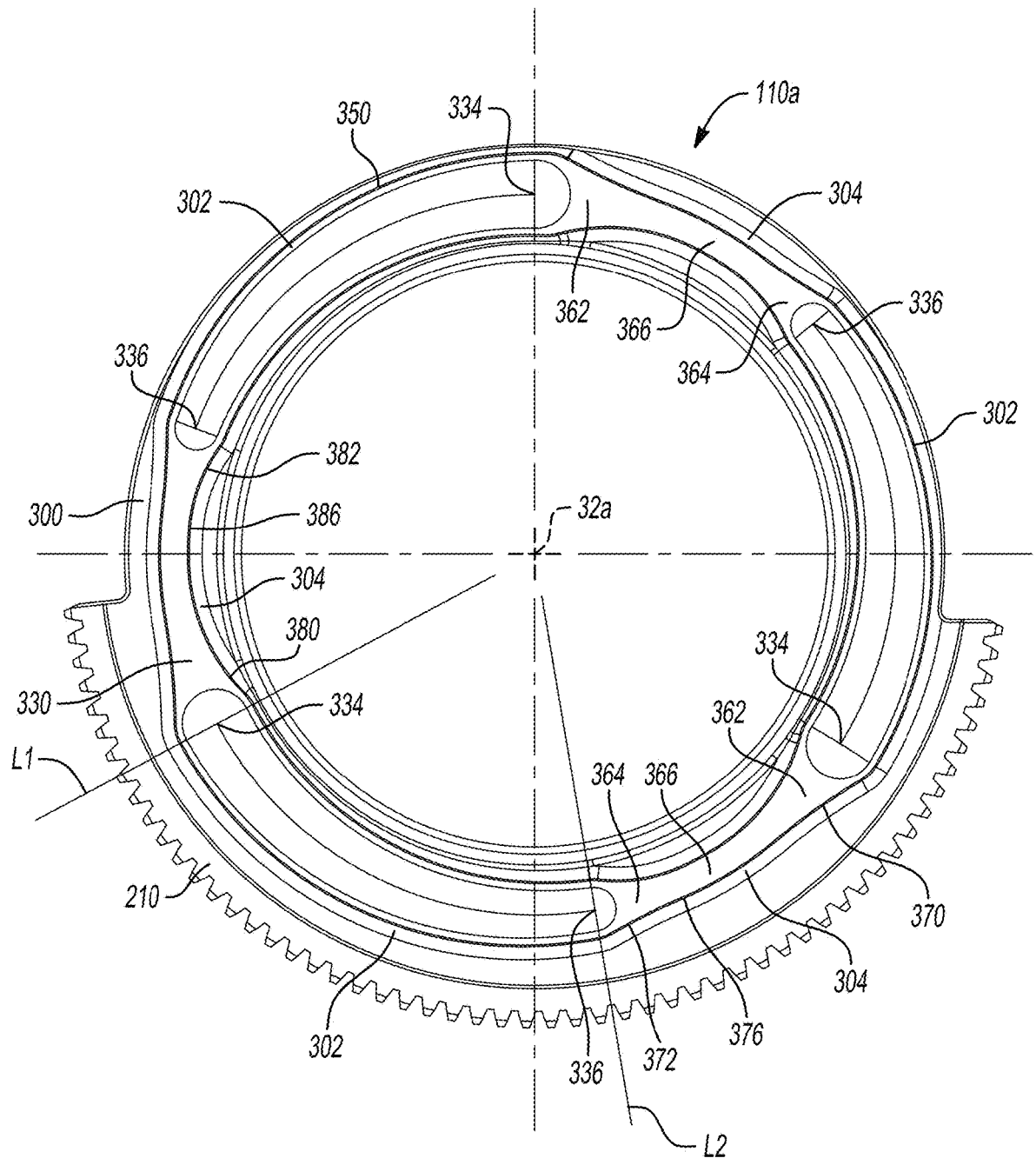
FIG. 7 is a front elevation view of a portion of the ball-ramp mechanism of FIG. 2, illustrating a first ball-ramp ring in more detail.
Figure 8:
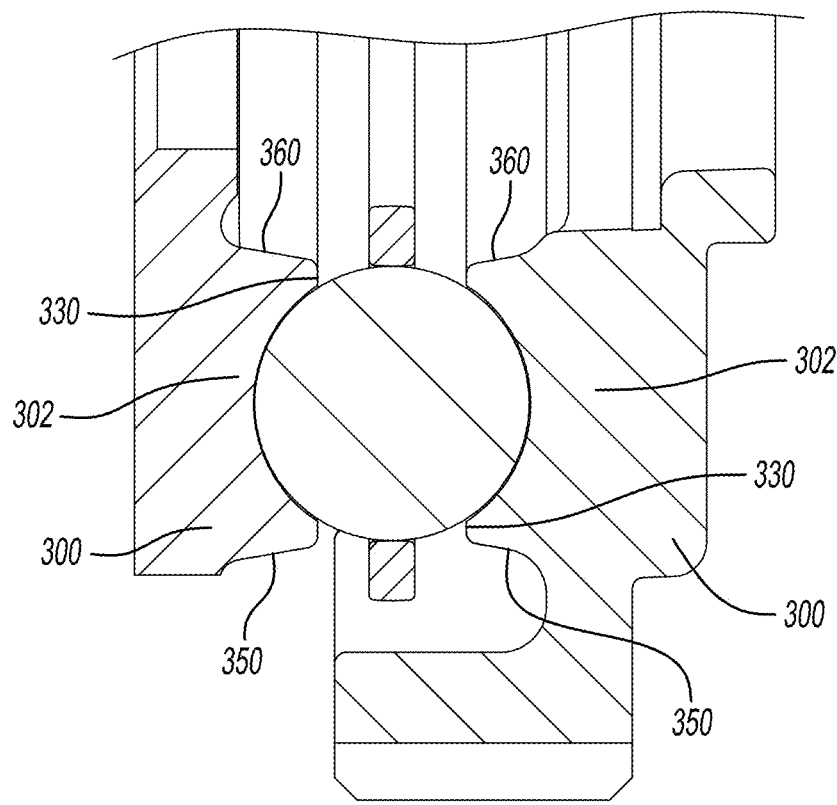
FIG. 8 is a section view taken along the line 8-8 of FIG. 4.
Figure 9:
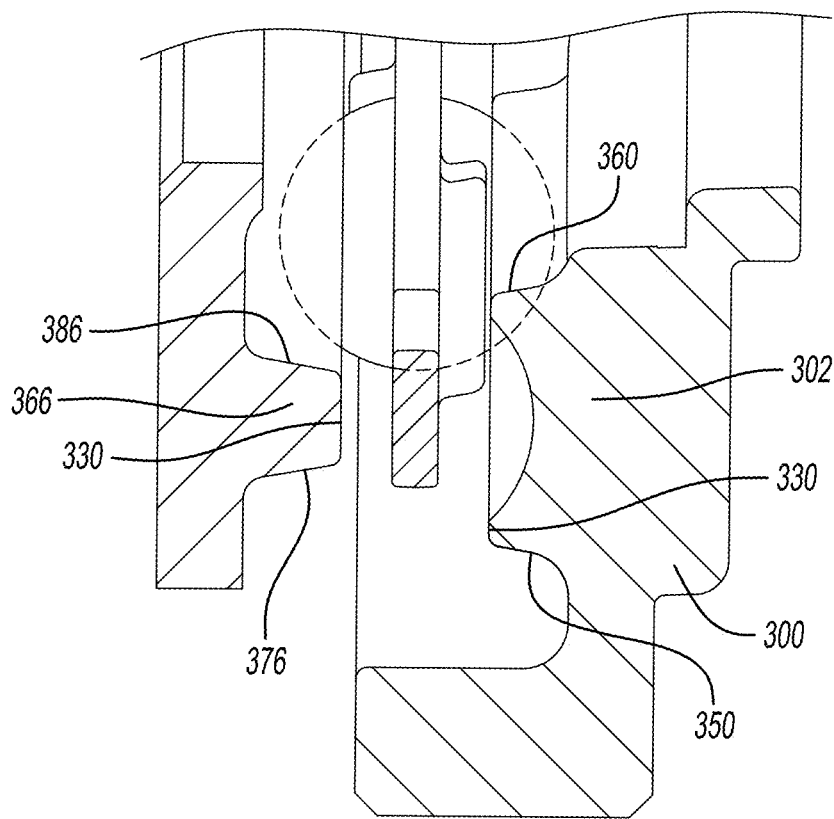
FIG. 9 is a section view taken along the line 9-9 of FIG. 4.
Figure 10:
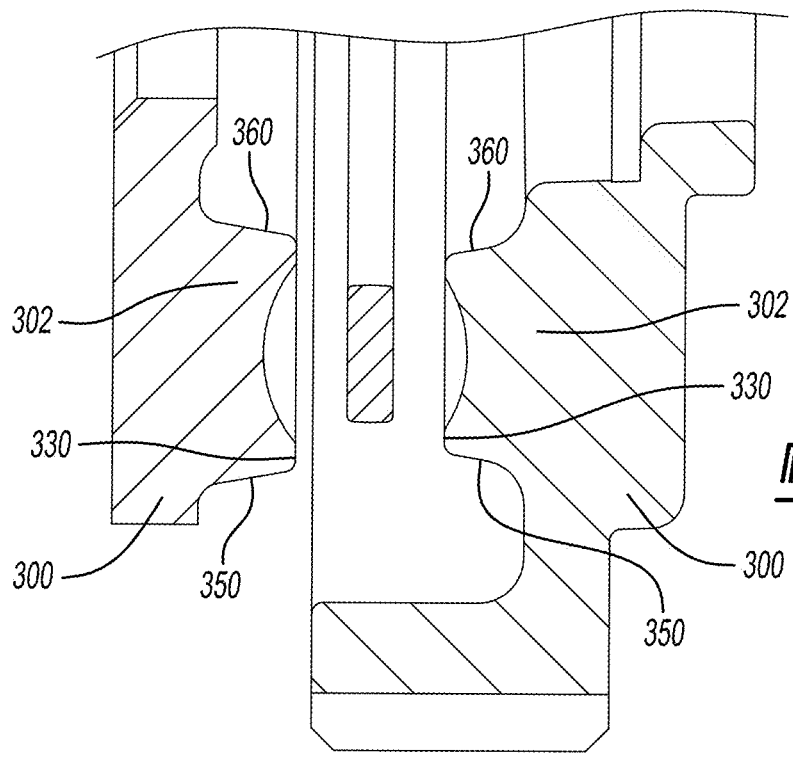
FIG. 10 is a section view taken along the line 10-10 of FIG. 4.
Figure 11:
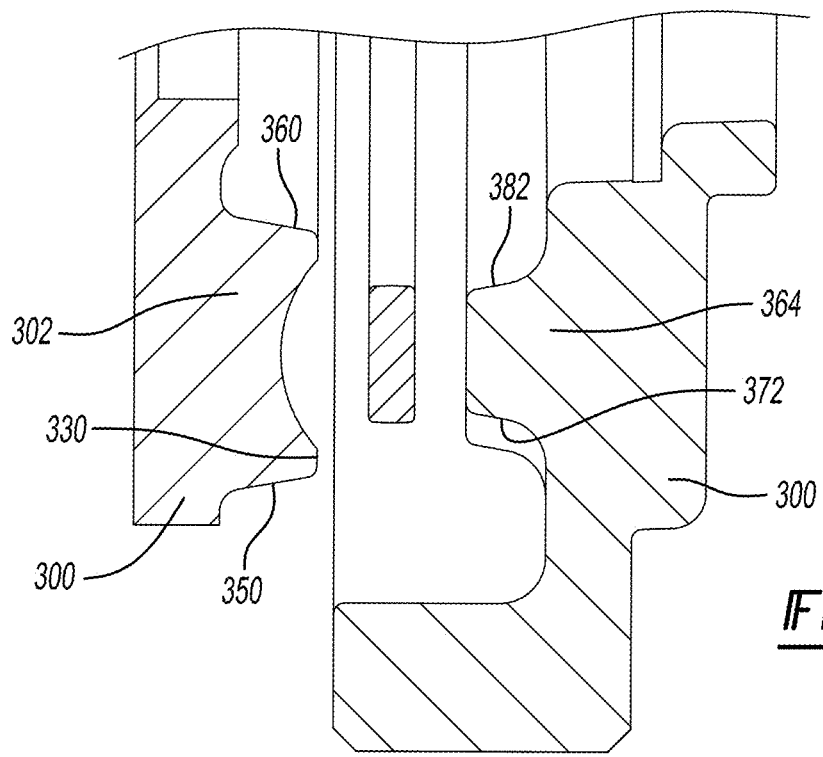
FIG. 11 is a section view taken along the line 11-11 of FIG. 4.
Figure 12:
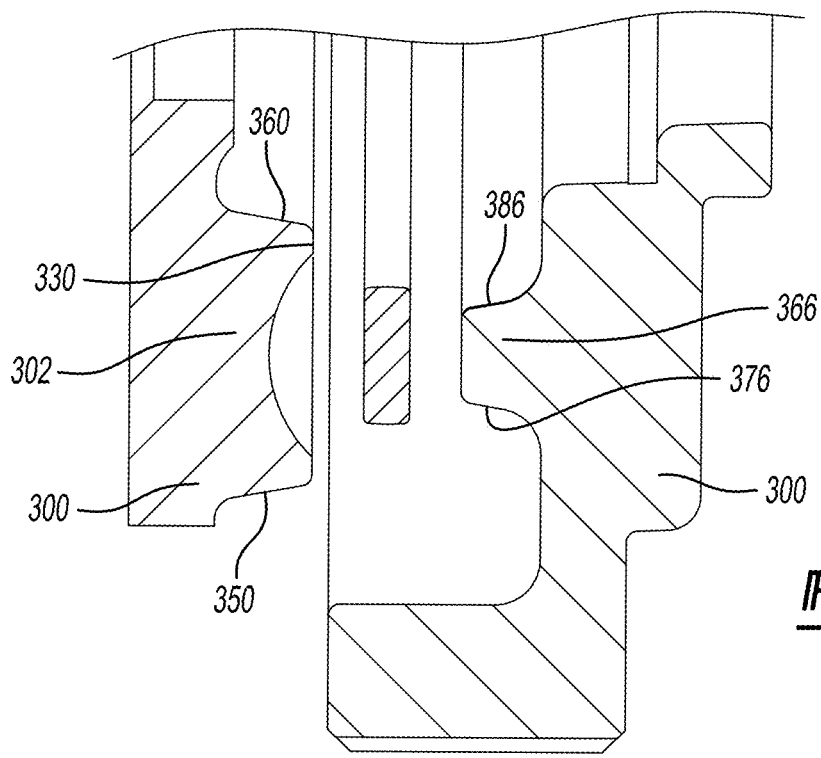
FIG. 12 is a section view taken along the line 12-12 of FIG. 4.
Figure 13:
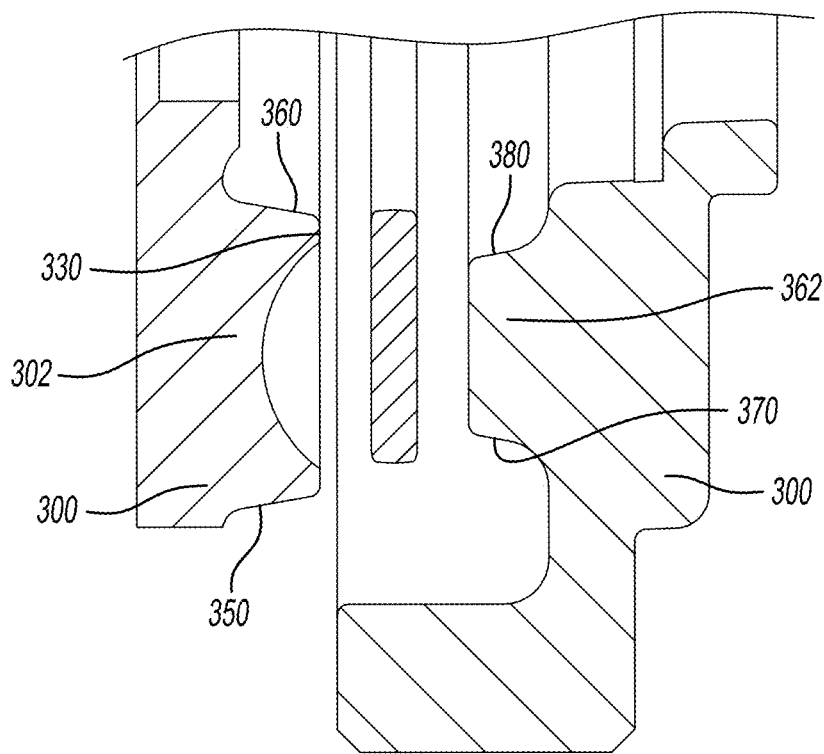
FIG. 13 is a section view taken along the line 13-13 of FIG. 4.
Figure 14:
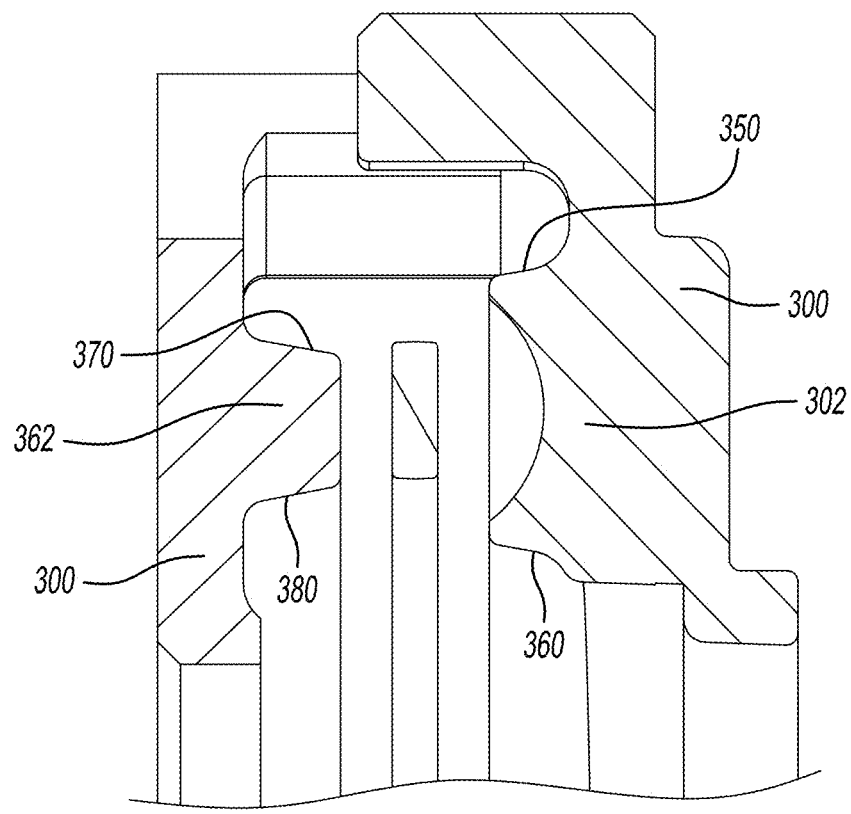
FIG. 14 is a section view taken along the line 14-14 of FIG. 4.
Figure 15:
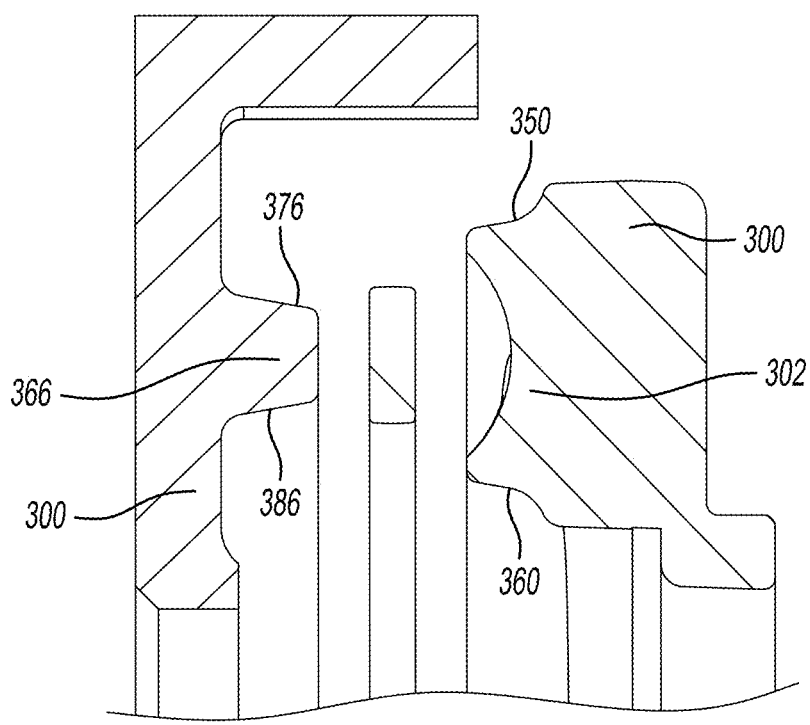
FIG. 15 is a section view taken along the line 15-15 of FIG. 4.
Figure 16:
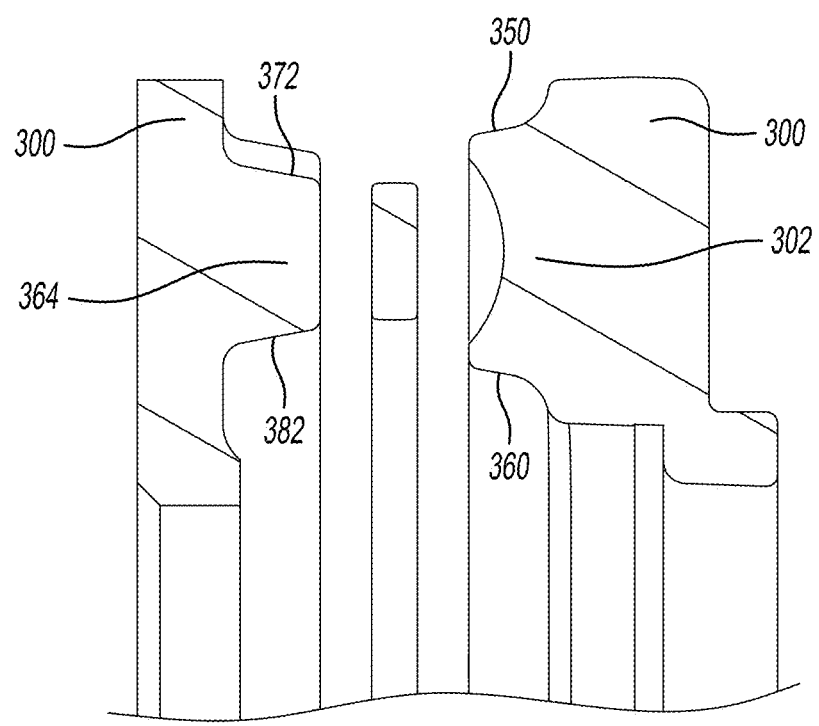
FIG. 16 is a section view taken along the line 16-16 of FIG. 4

With reference to FIGS. 3, 5 and 7, each of the first and second ball-ramp rings 110a and 112a can be constructed in a mass-conserving manner to have a backing structure 300, a plurality of ball supports 302, and optionally a plurality of transition structures 304. The backing structure 300 defines an annular rear surface 310 that is configured to transmit thrust force therethrough. If a gear element (e.g., the sector gear 210) is employed, the gear element can be fixedly coupled to the backing structure 300. The ball supports 302 are spaced circumferentially around the actuation axis 32a and are fixedly coupled to the backing structure 300 so as to extend forwardly therefrom. The ball supports 302 on the first ball-ramp ring 110 and the ball supports 302 on the second ball-ramp ring 112 each cooperate to define an associated annular front face 330. Each of the ball supports 302 can define an associated one of the ball tracks 116. Each ball track 116 can have a first circumferential end 334, which is disposed below the front face 330 by a first dimension, and a second circumferential end 336 that can be disposed below the front face 330 by a second dimension that is less than the first dimension. The ball tracks 116 can taper continuously, both in an axial direction and a radial direction, between the first and second circumferential ends 334 and 336, as is shown in the example provided. Alternatively, the ball tracks 116 could be configured with flat lands (not shown) at one or both of the first and second circumferential ends 334 and 336. If included, each of the transition structures 304 can be fixedly coupled to the backing structure 300 and disposed circumferentially between and connect a pair of the ball supports 302.

Figure 4:
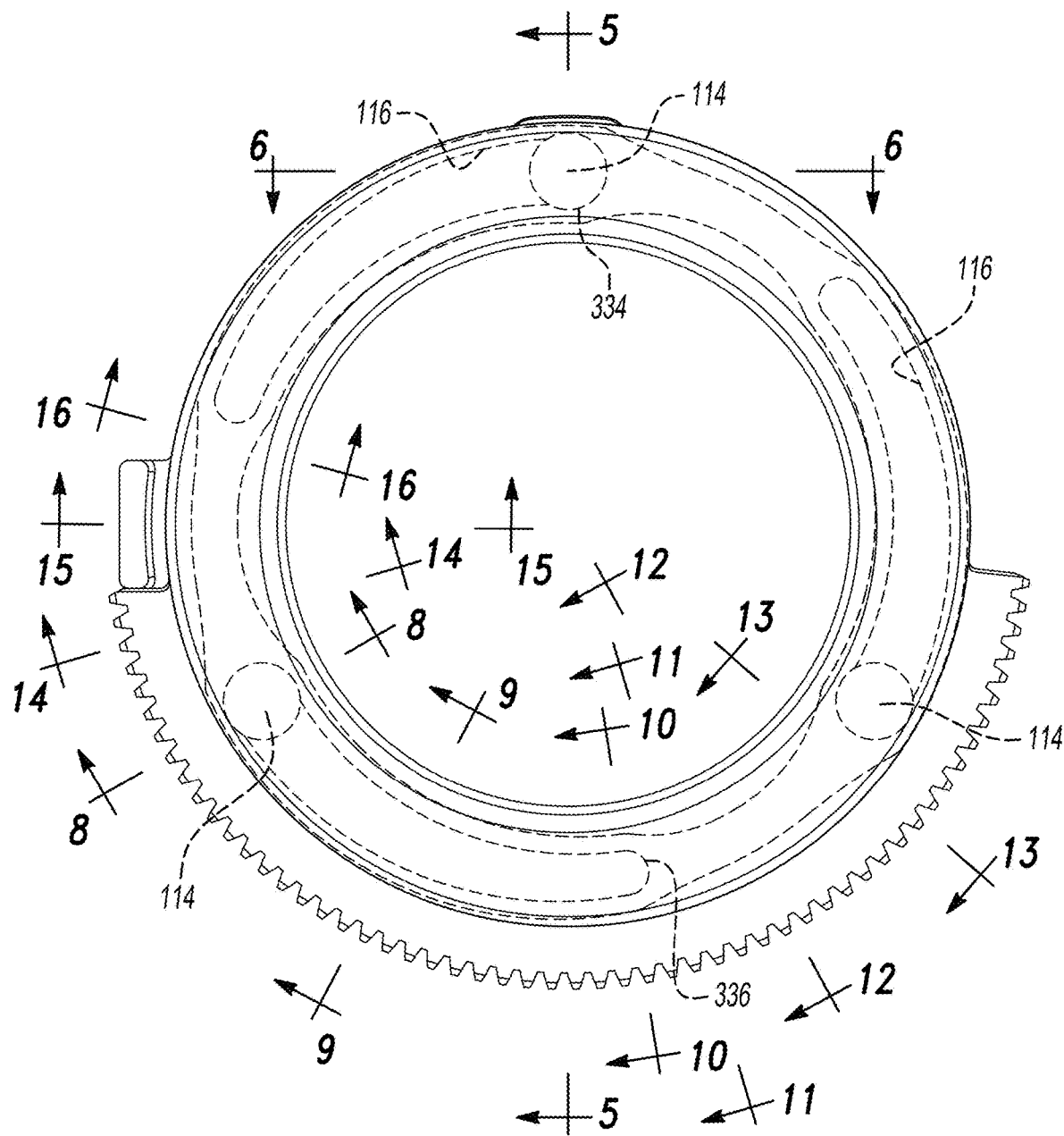
FIG. 4 is a front elevation view of a portion of the ball-ramp mechanism of FIG. 2.
Figure 6:
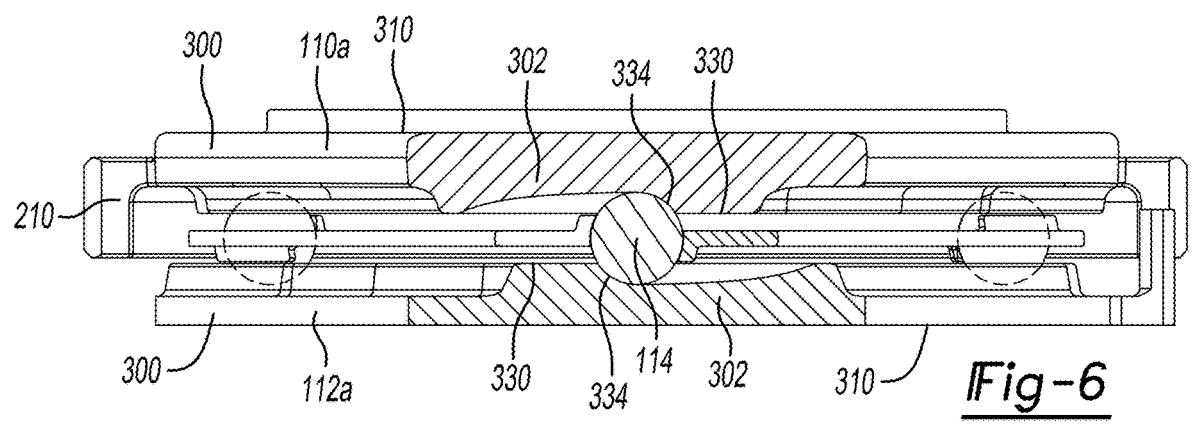
FIG. 6 is a section view taken along the line 6-6 of FIG. 4.

With reference to FIGS. 4-6, each of the balls 114 is received in an associated one of the ball tracks 116 and is movable between the first and second circumferential ends 334 and 336 of the associated one of the ball tracks 116.

With reference to FIG. 7, each of the ball supports 302 has a first radial width at a first location where the first circumferential end 334 intersects the front face 330 and a second radial width at a second location where the second circumferential end 336 intersects the front face 330. The first radial width is taken along a first line L1 passing through the actuation axis 32a and a center of an associated one of the balls 114 as positioned in the first circumferential end 334. The second width is taken along a second line L2 passing through the actuation axis 32a and the center of the associated one of the balls 114 as positioned in the second circumferential end 336.

With reference to FIGS. 8 through 16, an outer radial surface 350 of each of the ball supports 302 can taper radially outwardly from the front face 330 toward the backing structure 300. Also optionally, an inner radial surface 360 of each of the ball supports 302 can taper radially inwardly from the front face 330 toward the backing structure 300.

Returning to FIG. 7, each transition structure 304 has a first transition portion 362, which is fixedly coupled to the first circumferential end 334 of a first one of the pair of ball supports 302, a second transition portion 364, which is fixedly coupled to the second circumferential end 364 of a second one of the pair of the ball supports 302, and an intermediate transition portion 366 that fixedly couples the first and second transition portions 362 and 364 to one another. A radial width of the first transition portion 362 narrows with decreasing circumferential distance toward the second transition portion 364 and wherein a radial width of the second transition portion 364 narrows with decreasing circumferential distance toward the first transition portion 362. An outer radial surface 370 of the first transition portion 362 and/or an outer radial surface 372 of the second transition portion 364 and/or an outer radial surface 376 of the intermediate transition portion 366 on each of the transition structures 304 can taper radially outwardly from the front face 330 toward the backing structure 300. Similarly, an inner radial surface 380 of the first transition portion 362 and/or an inner radial surface 382 of the second transition portion 364 and/or an inner radial surface 386 of the intermediate transition portion 366 on each of the transition structures 304 can taper radially inwardly from the front face 330 toward the backing structure 300.

In contrast to a conventional ball-ramp mechanism that uses ball-ramp rings with sidewalls that are perpendicular to the front and rear faces, and which configures the front faces in a uniform annular manner, the present configuration not only provides a considerable reduction in the mass of the ball-ramp rings, but also maintains the strength of the ball-ramp rings in the locations where strength is required.

Figure 17A:
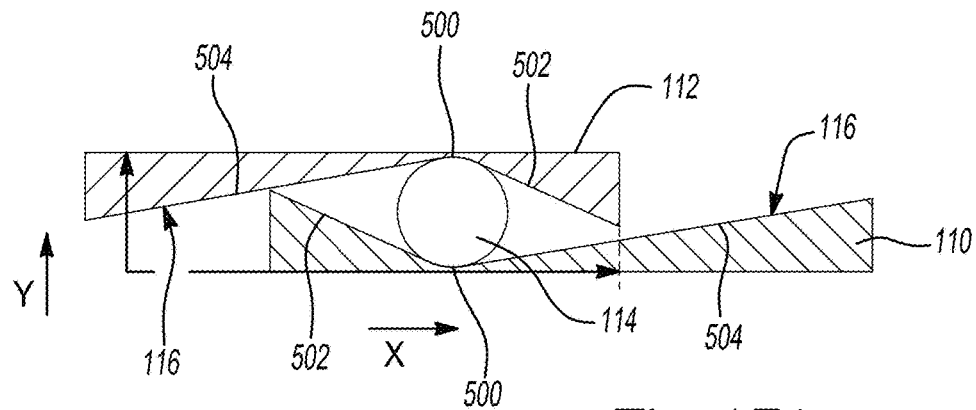
FIG. 17A is a schematic illustration of an exemplary ball-ramp mechanism having a bi-directional ball track with non-symmetric track portions.
Figure 17B:
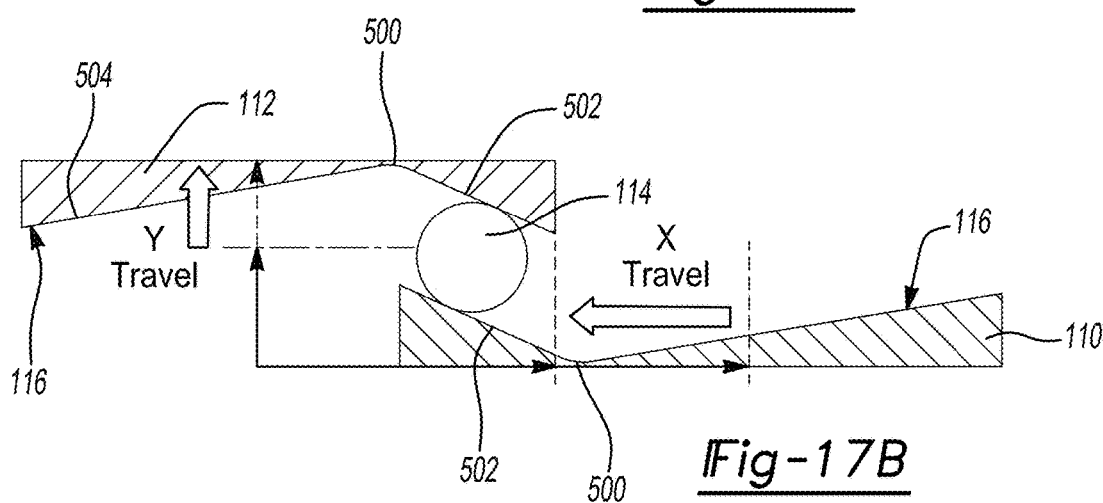
FIG. 17B is a schematic illustration similar to that of FIG. 17A but depicting the ball-ramp mechanism operating on a first track portion.
Figure 17C:
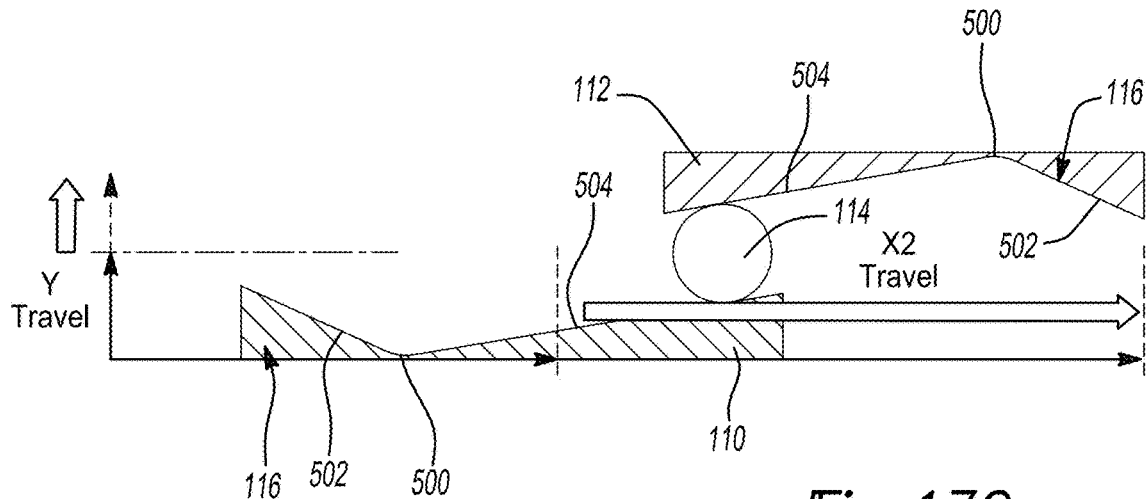
FIG. 17C is a schematic illustration similar to that of FIG. 17A but depicting the ball-ramp mechanism operating on a second track portion.

While the ball-ramp mechanism of the present disclosure has been illustrated and described as having conventionally shaped ball tracks, it will be appreciated that the ball tracks could be shaped somewhat differently. With reference to FIGS. 17A through 17C, the ball tracks 116 in the first and second ball-ramp rings 110 and 112 are schematically illustrated to have an intermediate track portion 500, which establishes the "low point" in the ball track 116, and first and second track portions 502 and 504, respectively, that extend from the opposite sides of the intermediate track portion 500. The first track portion 502 is configured with a first ramp rate, while the second track portion 504 is configured with a second ramp rate that is different than the first ramp rate. As used herein, the term "ramp rate" refers to a change in the axial width across the first and second ball-ramp rings 110 and 112 (designated as movement in the Y direction in FIGS. 17A-17C) divided by the distance that one of the balls 114 has traveled in a circumferential direction in its ball track 116 (designated as movement in the X direction in FIGS. 17A-17C).

Rotation of the first ball-ramp ring 110 relative to the second ball-ramp ring 112 in a first rotational direction when the balls 114 are disposed in the intermediate track portions 500 drives the balls 114 into the first track portions 502 as shown in FIG. 17B to drive the first and second ball-ramp rings 110 and 112 apart from one another at the first ramp rate. Similarly, rotation of the first ball-ramp ring 110 relative to the second ball-ramp ring 112 in a second rotational direction that is opposite the first rotational direction when the balls 114 are disposed in the intermediate track portions 500 drives the balls 114 into the second track portions 504 as shown in FIG. 17C to drive the first and second ball-ramp rings 110 and 112 apart from one another at the second ramp rate. Configuration in this manner permits the use of one ramp rate when the first ball-ramp ring is rotated relative to the second ball-ramp ring in a first rotational direction away from the low point, and the use of a second, different ramp rate when the first ball-ramp ring is rotated relative to the second ball-ramp ring in a second, opposite rotational direction away from the low point. In the example shown, the first ramp rate is higher than the second ramp rate so that a given displacement between the first and second ball-ramp rings 110 and 112 can be achieved with a relatively smaller amount of rotation of the first ball-ramp ring 110. This configuration may be beneficial in certain vehicle driveline configurations where a clutch can be operated to alternatively enhance vehicle dynamics or to provide enhanced propulsion. When the clutch is used to enhance vehicle dynamics, the power transmitted through the clutch can be relatively low in magnitude, but it can be desirable for the clutch to activate relatively quickly and as such, the first track portions 502 of the ball-ramp mechanism can be employed to operate the clutch. When the clutch is employed to provide enhanced propulsion, the power transmitted through the clutch can be relatively high in magnitude. Longer activation times are not typically problematic and as such, the second track portions 504 of the ball-ramp mechanism can be employed to operate the clutch. Because the second ramp rate is relatively smaller than the first ramp rate, a higher force output is possible for a given motor that is used to drive the first ball-ramp ring 110.

FIGS. 18 and 19 depict ball-ramp mechanisms having sets of ball tracks 116 that are relatively longer than the ball tracks of a conventional ball-ramp mechanism. More specifically, each set of the ball tracks 116 of the examples of FIGS. 18 and 19 is nested with at least one other set of ball tracks 116 so that each set of ball tracks 116 extends circumferentially about the first and second ball-ramp rings 110 and 112 over a sector of the first and second ball-ramp rings 110 and 112 having a central angle 510 that is greater than or equal to 360 degrees divided by the quantity of the sets of the ball tracks 116 that are employed in the ball-ramp mechanism.

In the example of FIG. 18, each set of ball tracks 116 follows a spiral track rather than a semi-circular track so that one end of a given ball track 116 is disposed radially inward of a first one of the other sets of ball tracks 116, while the opposite end of the given ball track 116 is disposed radially outward of a second one of the other sets of ball tracks 116. Configuration in this manner (i.e., in which each set of ball tracks 116 is disposed eccentrically about the actuation axis 32) permits each set of ball tracks 116 to extend over a sector of the first and second ball-ramps 110 and 112 with a central angle 510 that is greater than 180 degrees, which is far greater than 120 degrees, or 360 degrees divided by the quantity of the sets of the ball tracks 116 that are employed in the ball-ramp mechanism (i.e., 360 degrees divided by 3).

With reference to FIG. 19, the sets of ball tracks 116 are disposed concentrically about the actuation axis 32, but one or more sets of the ball tracks 116 can be radially offset from one or more of the other ball tracks 116. In the example provided, each set of the ball tracks 116 is radially offset from all of the other sets of ball tracks 116 and as such, the central angle of the sector can approach 360 degrees.

With reference to FIG. 20, the ball tracks 116 are configured eccentrically about the actuation axis 32 so that at least one of the first and second ball-ramp rings 110 and 112 is movable in an eccentric manner about the actuation axis 32. This configuration may permit the eccentrically moving ball-ramp ring to be used in conjunction with an operator 520 to operate the operator 520. The operator 520 can be selected from a group of operators that includes sensors, switches, valves, pumps and combinations of two or more thereof. It will be appreciated that "operation" of a sensor, switch, or valve is a change in the state of the sensor, switch or valve, while "operation" of a pump can entail movement of an element of the pump, for example to drive fluid out of the pump. It will be appreciated that the eccentrically moving ball-ramp ring may be employed to rotate into the proximity of the operator and/or to drive a portion of the operator with a radially-directed actuation force, such as for causing a piston or lever associated with a sensor, switch, valve element or pump (e.g., axial piston pump) to translate the piston or lever in a direction that is transverse to the actuation axis 32.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle driveline component comprising:
a ball-ramp mechanism having a first ball-ramp ring, a second ball-ramp ring and a plurality of balls, the first and second ball-ramp rings being disposed concentrically about an actuation axis, each of the first and second ball-ramp rings having a backing structure and a plurality of ball supports that are fixedly coupled to the backing structure, the backing structure defining a rear surface, the ball supports being spaced circumferentially about actuation axis and extending forwardly of the backing structure, the ball supports cooperating to define a front face, each of the ball supports defining a ball track, each ball track having a first circumferential end, which is disposed below the front face by a first dimension, and a second circumferential end that is disposed below the front face by a second dimension that is less than the first dimension, each of the ball tracks having a radial width that tapers between the first circumferential end and the second circumferential end, each of the balls being received in an associated one of the ball tracks and being movable between the first and second circumferential ends of the associated one of the ball tracks;
wherein each of the ball supports has a first radial width at a first location where the first circumferential end intersects the front face and a second radial width at a second location where the second circumferential end intersects the front face, the first radial width being taken along a first line passing through the actuation axis and a center of an associated one of the balls as positioned in the first circumferential end, the second width being taken along a second line passing through the actuation axis and the center of the associated one of the balls as positioned in the second circumferential end; and
wherein the first radial width is greater than the second radial width;
wherein an outer radial surface of each of the ball supports tapers radially outwardly from the front face toward the backing structure.

2. The vehicle driveline component of claim 1, wherein each of the first and second ball-ramp rings further comprises a plurality of transition structures, each of the transition structures being fixedly coupled to the backing structure and disposed circumferentially between a pair of the ball supports.

3. The vehicle driveline component of claim 1, wherein the first ball-ramp ring further comprises a gear element fixedly coupled to the backing structure of the first ball-ramp ring.

4. The vehicle driveline component of claim 3, wherein the gear element is a sector gear.

5. The vehicle driveline component of claim 1, further comprising a clutch having a clutch input member, a clutch output member, and wherein the clutch is selectively operable in a first mode, in which the clutch input member is rotationally decoupled from the clutch output member, and a second mode in which the clutch output member is coupled to the clutch input member for rotation therewith, and wherein an operational mode of the clutch changes between the first and second modes in response to relative rotational movement between the first and second ball-ramp rings.

6. The vehicle driveline component of claim 5, wherein the clutch is a friction clutch.

7. The vehicle driveline component of claim 6, further comprising a differential assembly and an output shaft, wherein the differential assembly includes a differential input and first and second differential outputs, wherein the output shaft is coupled to one of the first and second differential outputs for rotation therewith, wherein the clutch input member is coupled to the differential input for rotation therewith, and wherein the clutch output member is coupled to the output shaft for rotation therewith.

8. The vehicle driveline component of claim 6, further comprising a power take-off input member and a power take-off output member, the power take-off input member being disposed for rotation about the actuation axis, the power take-off output member being disposed for rotation about a power take-off output axis that is transverse to the actuation axis, and wherein the clutch is disposed in a torque transmission path between the power take-off input member and the power take-off output member.

9. A vehicle driveline component comprising:
a ball-ramp mechanism having a first ball-ramp ring, a second ball-ramp ring and a plurality of balls, the first and second ball-ramp rings being disposed concentrically about an actuation axis, each of the first and second ball-ramp rings having a backing structure and a plurality of ball supports that are fixedly coupled to the backing structure, the backing structure defining a rear surface, the ball supports being spaced circumferentially about actuation axis and extending forwardly of the backing structure, the ball supports cooperating to define a front face, each of the ball supports defining a ball track, each ball track having a first circumferential end, which is disposed below the front face by a first dimension, and a second circumferential end that is disposed below the front face by a second dimension that is less than the first dimension, each of the ball tracks having a radial width that tapers between the first circumferential end and the second circumferential end, each of the balls being received in an associated one of the ball tracks and being movable between the first and second circumferential ends of the associated one of the ball tracks;

wherein each of the ball supports has a first radial width at a first location where the first circumferential end intersects the front face and a second radial width at a second location where the second circumferential end intersects the front face, the first radial width being taken along a first line passing through the actuation axis and a center of an associated one of the balls as positioned in the first circumferential end, the second width being taken along a second line passing through the actuation axis and the center of the associated one of the balls as positioned in the second circumferential end; and wherein the first radial width is greater than the second radial width;

wherein an inner radial surface of each of the ball supports tapers radially inwardly from the front face toward the backing structure.

10. The vehicle driveline component of claim 9, wherein each of the first and second ball-ramp rings further comprises a plurality of transition structures, each of the transition structures being fixedly coupled to the backing structure and disposed circumferentially between a pair of the ball supports.

11. The vehicle driveline component of claim 9, wherein the first ball-ramp ring further comprises a gear element fixedly coupled to the backing structure of the first ball-ramp ring.

12. The vehicle driveline component of claim 11, wherein the gear element is a sector gear.

13. The vehicle driveline component of claim 9, further comprising a clutch having a clutch input member, a clutch output member, and wherein the clutch is selectively operable in a first mode, in which the clutch input member is rotationally decoupled from the clutch output member, and a second mode in which the clutch output member is coupled to the clutch input member for rotation therewith, and wherein an operational mode of the clutch changes between the first and second modes in response to relative rotational movement between the first and second ball-ramp rings.

14. The vehicle driveline component of claim 13, wherein the clutch is a friction clutch.

15. The vehicle driveline component of claim 14, further comprising a differential assembly and an output shaft, wherein the differential assembly includes a differential input and first and second differential outputs, wherein the output shaft is coupled to one of the first and second differential outputs for rotation therewith, wherein the clutch input member is coupled to the differential input for rotation therewith, and wherein the clutch output member is coupled to the output shaft for rotation therewith.

16. The vehicle driveline component of claim 14, further comprising a power take-off input member and a power take-off output member, the power take-off input member being disposed for rotation about the actuation axis, the power take-off output member being disposed for rotation about a power take-off output axis that is transverse to the actuation axis, and wherein the clutch is disposed in a torque transmission path between the power take-off input member and the power take-off output member.

17. A vehicle driveline component comprising:
a ball-ramp mechanism having a first ball-ramp ring, a second ball-ramp ring and a plurality of balls, the first and second ball-ramp rings being disposed concentrically about an actuation axis, each of the first and second ball-ramp rings having a backing structure and a plurality of ball supports that are fixedly coupled to the backing structure, the backing structure defining a rear surface, the ball supports being spaced circumferentially about actuation axis and extending forwardly of the backing structure, the ball supports cooperating to define a front face, each of the ball supports defining a ball track, each ball track having a first circumferential end, which is disposed below the front face by a first dimension, and a second circumferential end that is disposed below the front face by a second dimension that is less than the first dimension, each of the ball tracks having a radial width that tapers between the first circumferential end and the second circumferential end, each of the balls being received in an associated one of the ball tracks and being movable between the first and second circumferential ends of the associated one of the ball tracks;

wherein each of the ball supports has a first radial width at a first location where the first circumferential end intersects the front face and a second radial width at a second location where the second circumferential end intersects the front face, the first radial width being taken along a first line passing through the actuation axis and a center of an associated one of the balls as positioned in the first circumferential end, the second width being taken along a second line passing through the actuation axis and the center of the associated one of the balls as positioned in the second circumferential end; and wherein the first radial width is greater than the second radial width;

wherein each transition structure has a first transition portion, which is fixedly coupled to the first circumferential end of a first one of the pair of ball supports, a second transition portion, which is fixedly coupled to the second circumferential end of a second one of the pair of the ball supports, and an intermediate transition portion that fixedly couples the first and second transition portions to one another, wherein a radial width of the first transition portion narrows with decreasing distance toward the second transition portion and wherein a radial width of the second transition portion narrows with decreasing distance toward the first transition portion; and wherein an outer radial surface of at least one of the first transition portion and the second transition portion on each of the transition structures tapers radially outwardly from the front face toward the backing structure.

18. A vehicle driveline component comprising:
a ball-ramp mechanism having a first ball-ramp ring, a second ball-ramp ring and a plurality of balls, the first and second ball-ramp rings being disposed concentrically about an actuation axis, each of the first and second ball-ramp rings having a backing structure and a plurality of ball supports that are fixedly coupled to the backing structure, the backing structure defining a rear surface, the ball supports being spaced circumferentially about actuation axis and extending forwardly of the backing structure, the ball supports cooperating to define a front face, each of the ball supports defining a ball track, each ball track having a first circumferential end, which is disposed below the front face by a first dimension, and a second circumferential end that is disposed below the front face by a second dimension that is less than the first dimension, each of the ball tracks having a radial width that tapers between the first circumferential end and the second circumferential end, each of the balls being received in an associated one of the ball tracks and being movable between the first and second circumferential ends of the associated one of the ball tracks;
wherein each of the ball supports has a first radial width at a first location where the first circumferential end intersects the front face and a second radial width at a second location where the second circumferential end intersects the front face, the first radial width being taken along a first line passing through the actuation axis and a center of an associated one of the balls as positioned in the first circumferential end, the second width being taken along a second line passing through the actuation axis and the center of the associated one of the balls as positioned in the second circumferential end; and
wherein the first radial width is greater than the second radial width;
wherein each transition structure has a first transition portion, which is fixedly coupled to the first circumferential end of a first one of the pair of ball supports, a second transition portion, which is fixedly coupled to the second circumferential end of a second one of the pair of the ball supports, and an intermediate transition portion that fixedly couples the first and second transition portions to one another, wherein a radial width of the first transition portion narrows with decreasing distance toward the second transition portion and wherein a radial width of the second transition portion narrows with decreasing distance toward the first transition portion; and
wherein an inner radial surface of at least one of the first transition portion and the second transition portion on each of the transition structures tapers radially inwardly from the front face toward the backing structure.

19. A vehicle driveline component comprising:
a ball-ramp mechanism having a first ball-ramp ring, a second ball-ramp ring and a plurality of balls, the first and second ball-ramp rings being disposed concentrically about an actuation axis, each of the first and second ball-ramp rings having a backing structure and a plurality of ball supports that are fixedly coupled to the backing structure, the backing structure defining a rear surface, the ball supports being spaced circumferentially about actuation axis and extending forwardly of the backing structure, the ball supports cooperating to define a front face, each of the ball supports defining a ball track, each ball track having a first circumferential end, which is disposed below the front face by a first dimension, and a second circumferential end that is disposed below the front face by a second dimension that is less than the first dimension, each of the ball tracks having a radial width that tapers between the first circumferential end and the second circumferential end, each of the balls being received in an associated one of the ball tracks and being movable between the first and second circumferential ends of the associated one of the ball tracks;
wherein each of the ball supports has a first radial width at a first location where the first circumferential end intersects the front face and a second radial width at a second location where the second circumferential end intersects the front face, the first radial width being taken along a first line passing through the actuation axis and a center of an associated one of the balls as positioned in the first circumferential end, the second width being taken along a second line passing through the actuation axis and the center of the associated one of the balls as positioned in the second circumferential end; and
wherein the first radial width is greater than the second radial width;
wherein each transition structure has a first transition portion, which is fixedly coupled to the first circumferential end of a first one of the pair of ball supports, a second transition portion, which is fixedly coupled to the second circumferential end of a second one of the pair of the ball supports, and an intermediate transition portion that fixedly couples the first and second transition portions to one another, wherein a radial width of the first transition portion narrows with decreasing distance toward the second transition portion and wherein a radial width of the second transition portion narrows with decreasing distance toward the first transition portion; and
wherein an outer radial surface of the intermediate transition portion of each of the transition structures tapers radially outwardly from the front face toward the backing structure.

20. A vehicle driveline component comprising:
a ball-ramp mechanism having a first ball-ramp ring, a second ball-ramp ring and a plurality of balls, the first and second ball-ramp rings being disposed concentrically about an actuation axis, each of the first and second ball-ramp rings having a backing structure and a plurality of ball supports that are fixedly coupled to the backing structure, the backing structure defining a rear surface, the ball supports being spaced circumferentially about actuation axis and extending forwardly of the backing structure, the ball supports cooperating to define a front face, each of the ball supports defining a ball track, each ball track having a first circumferential end, which is disposed below the front face by a first dimension, and a second circumferential end that is disposed below the front face by a second dimension that is less than the first dimension, each of the ball tracks having a radial width that tapers between the first circumferential end and the second circumferential end, each of the balls being received in an associated one of the ball tracks and being movable between the first and second circumferential ends of the associated one of the ball tracks;
wherein each of the ball supports has a first radial width at a first location where the first circumferential end intersects the front face and a second radial width at a second location where the second circumferential end intersects the front face, the first radial width being taken along a first line passing through the actuation axis and a center of an associated one of the balls as positioned in the first circumferential end, the second width being taken along a second line passing through the actuation axis and the center of the associated one of the balls as positioned in the second circumferential end; and wherein the first radial width is greater than the second radial width;

wherein each transition structure has a first transition portion, which is fixedly coupled to the first circumferential end of a first one of the pair of ball supports, a second transition portion, which is fixedly coupled to the second circumferential end of a second one of the pair of the ball supports, and an intermediate transition portion that fixedly couples the first and second transition portions to one another, wherein a radial width of the first transition portion narrows with decreasing distance toward the second transition portion and wherein a radial width of the second transition portion narrows with decreasing distance toward the first transition portion; and wherein an inner radial surface of the intermediate transition portion of each of the transition structures tapers radially inwardly from the front face toward the backing structure.

21. A vehicle driveline component comprising:
a ball-ramp mechanism having a first ball-ramp ring, a second ball-ramp ring and a plurality of balls, the first and second ball-ramp rings being disposed about an actuation axis, each of the first and second ball-ramp rings defining a plurality of ball tracks, wherein the ball tracks of the first ball-ramp ring are disposed eccentrically about the actuation axis, each of the balls being received into an associated set of ball tracks in the first and second ball-ramp rings, wherein relative rotation between the first and second ball-ramp rings causes eccentric motion of the first ball-ramp ring about the actuation axis.

22. The vehicle driveline component of claim 21, further comprising an operator selected from a group consisting of sensors, switches, valves, pumps and combinations of two or more thereof, and wherein the operator is operated through eccentric motion of the second ball-ramp ring about the actuation axis.

* * * * *